(12) United States Patent
Scheiffele et al.

(10) Patent No.: US 12,176,123 B2
(45) Date of Patent: Dec. 24, 2024

(54) METHODS AND COMPOSITIONS FOR MINIMIZING X-RAY SCATTERING ARTIFACTS

(71) Applicant: University of Florida Research Foundation, Inc., Gainesville, FL (US)

(72) Inventors: Gary W. Scheiffele, Gainesville, FL (US); Edward L. Stanley, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 0 days.

(21) Appl. No.: 18/301,677

(22) Filed: Apr. 17, 2023

(65) Prior Publication Data

US 2023/0253130 A1    Aug. 10, 2023

Related U.S. Application Data

(63) Continuation of application No. 17/458,743, filed on Aug. 27, 2021, now Pat. No. 11,657,924, which is a
(Continued)

(51) Int. Cl.
*G21K 1/10* (2006.01)
*B05D 1/12* (2006.01)
(Continued)

(52) U.S. Cl.
CPC ............. *G21K 1/10* (2013.01); *B05D 1/12* (2013.01); *C09D 1/00* (2013.01); *C09D 5/033* (2013.01); *C09D 5/32* (2013.01)

(58) Field of Classification Search
CPC ........................................................ G21K 1/10
See application file for complete search history.

(56) References Cited

U.S. PATENT DOCUMENTS

| 5,158,854 A | * | 10/1992 | Imamura | ............... G03F 7/0758 430/165 |
| 6,455,860 B1 | | 9/2002 | Mooney | |

(Continued)

OTHER PUBLICATIONS

"Unique tool for high quality scatter reduced industrial", scatter|correct, Apr. 2016, Brochure pp. 1-2, GE Inspection Technologies, www.gemeasurement.com/CT.

*Primary Examiner* — Robert A Vetere
(74) *Attorney, Agent, or Firm* — Thomas | Horstemeyer LLP

(57) ABSTRACT

Disclosed are methods for minimizing x-ray scattering artifacts, the method comprising: contacting an object with an x-ray scattering mitigation material. The contacting can comprise coating the x-ray scattering material on the object, including spraying a solution of suspension of an x-ray scattering mitigation material onto the object or dry powder coating the object with a x-ray scattering mitigation material. Alternatively, the contacting can comprise immersing the object in a fluid comprising the x-ray scattering material. The fluid can be a gas, a liquid, or a gel. The disclosed x-ray scattering mitigation material can be optimized for mitigating Compton radiation scattering or for mitigating Rayleigh radiation scattering. This abstract is intended as a scanning tool for purposes of searching in the particular art and is not intended to be limiting of the present disclosure.

7 Claims, 6 Drawing Sheets

Related U.S. Application Data continuation of application No. 16/412,355, filed on May 14, 2019, now Pat. No. 11,183,314.

(60) Provisional application No. 62/671,087, filed on May 14, 2018.

(51) Int. Cl.
*C09D 1/00* (2006.01)
*C09D 5/03* (2006.01)
*C09D 5/32* (2006.01)

(56) References Cited

U.S. PATENT DOCUMENTS

| | | | |
|---|---|---|---|
| 6,888,144 B2 | 5/2005 | Rodricks | |
| 11,183,314 B2 * | 11/2021 | Scheiffele | C09D 5/32 |
| 11,657,924 B2 * | 5/2023 | Scheiffele | G21K 1/10 |
| | | | 427/180 |
| 2003/0089856 A1 * | 5/2003 | Beguiristain | G21K 1/06 |
| | | | 250/370.09 |
| 2007/0269935 A1 * | 11/2007 | Pethe | H05K 3/046 |
| | | | 438/129 |
| 2012/0321785 A1 * | 12/2012 | Rogers | C01B 32/162 |
| | | | 427/249.1 |
| 2016/0369407 A1 | 12/2016 | Dudon et al. | |

* cited by examiner

METHODS AND COMPOSITIONS FOR MINIMIZING X-RAY SCATTERING ARTIFACTS

CROSS-REFERENCE TO RELATED APPLICATIONS

This application is a continuation and claims benefit and priority to U.S. Utility Application having the Ser. No. 17/458,743, filed on Aug. 27, 2021, which is a continuation and claims benefit and priority to U.S. Utility Application having the Ser. No. 16/412,355, filed on May 14, 2019, which claims the benefit and priority of U.S. Provisional Application having Ser. No. 62/671,087, filed on May 14, 2018, both of which are incorporated herein by reference in its entirety.

BACKGROUND

Compton and Rayleigh scattering are significant problems affecting resolution and precision of x-ray imaging. Despite the significant issues associated with these scattering phenomena, there remain a lack of effective methods to mitigate such x-ray scattering. These needs and other needs are satisfied by the present disclosure.

SUMMARY

In accordance with the purpose(s) of the present disclosure, as embodied and broadly described herein, the disclosure, in one aspect, relates to methods for minimizing x-ray scattering artifacts, the method comprising: contacting an object with an x-ray scattering mitigation material. In some aspects, the x-ray scattering mitigation material is optimized for mitigating Compton radiation scattering. In other aspects, the x-ray scattering mitigation material is optimized for mitigating Rayleigh radiation scattering. In various aspects, the contacting can comprise coating the x-ray scattering material on the object, including spraying a solution of suspension of an x-ray scattering mitigation material onto the object or dry powder coating the object with an x-ray scattering mitigation material. In other aspects, the contacting can comprise immersing the object in a fluid comprising the x-ray scattering material. In a further aspect, the fluid is a gas. In a still further aspect, the fluid is a liquid or a gel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A shows on the left side a hemi-section of steel tube with a single coating of FEP and on the right side a hemi-section of steel tube with four coatings of FEP. A scale bar is shown in the bottom portion of the image. FIG. 3B shows a close-up section of the steel tube with a single coating of FEP. FIG. 3C shows a close-up section of the steel tube with four coatings of FEP.

Figure 1A:
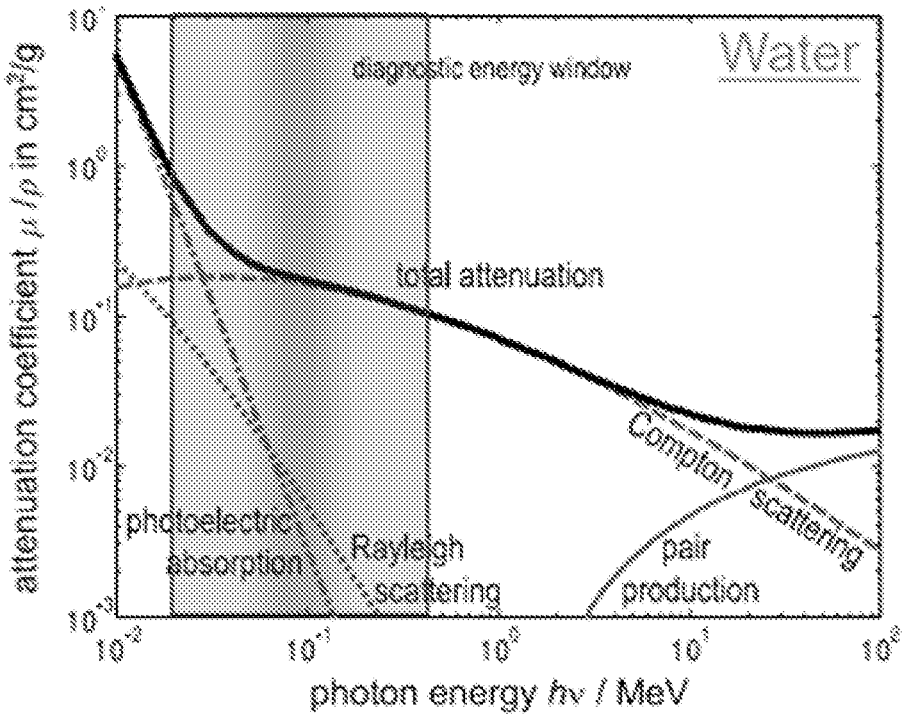
FIGS. 1A-1C show representative attenuation curves for water, bone, and area.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "an x-ray scattering mitigation material," "an object," or "a x-ray beam," including, but not limited to, two or more such x-ray scattering mitigation materials, objects, or x-ray beams, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of an x-ray scattering mitigation material refers to an amount that is sufficient to achieve the desired improvement in the x-ray scattering, i.e., a decrease, by the formulation component, e.g. achieving the desired level of x-ray scattering.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Disclosed Methods

In various aspects, the disclosed methods pertain to a method for minimizing x-ray scattering artifacts, the method comprising contacting an object with an x-ray scattering mitigation material. The x-ray scattering mitigation material can be a fine powder, salt solution, nanofluid, a semi-soft material, e.g., a putty or gel, comprising a metal and/or ceramic filled material. The method provides for minimized or mitigated scatter artifacts that arise most strongly during an X-ray or computed tomography (CT) scan of an object in which the object interfaces with the surrounding air. For example, in dentistry, scatter can occur from existing fillings and crowns, which can distort X-ray images used in diagnosis. In the automotive and aviation industries X-ray and CT imaging are frequently used to facilitate inspection and analysis of complex parts produced through additive manufacture without destroying them. The value of the global market for industrial X-ray inspection systems is estimated to grow to about $350 million by 2022. While available imaging techniques are useful, scattering artifacts can obscure images, causing misinterpretation. Since X-ray attenuation of a spectrum of X-ray energies is a combination of energy, absorption, Rayleigh scatter, and Compton scatter (X-ray fluorescence), the disclosed methods which allow tailoring a surface conforming material to an object to be imaged can greatly increase edge definition. In conventional methods, hardware and software solutions have been utilized to resolve this issue, but these are often expensive and imperfect. The disclosed methods provide improved image quality and low cost compared to conventional methods. In particular, the disclosed methods provide scatter mitigation using a variety of materials that improve the fidelity of X-ray images by reducing scattering at the surface of an object. The surface can be an interior surface and/or an exterior surface provided that there is an open path to the exterior of the sample. The disclosed methods and materials mitigate scattering by preferentially absorbing scattered photons, thereby providing a simple and cost-effective strategy for improving clarity of X-rayed and CT scanned objects.

Figure 1B:
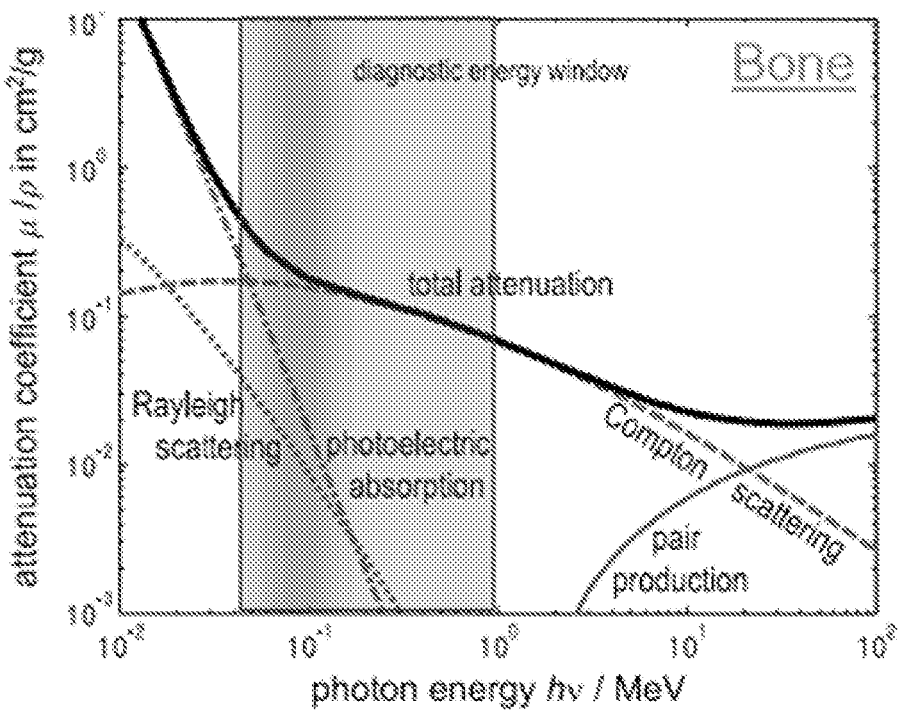
Figure 1C:
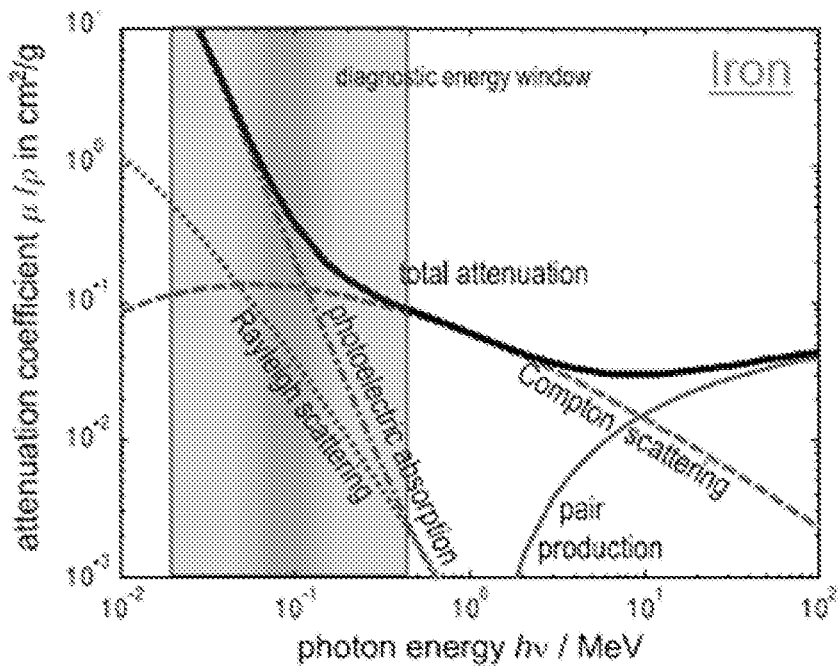

In conventional X-ray and CT imaging, the most noticeable scatter artifacts appear at the boundary between the surface of an object and the surrounding air or between high attenuation areas within a scan (for example, between two fillings in a 3D scan of a mouth). A major factor in these artifacts is Compton scattered X-rays (where some energy is absorbed and some re-emitted as an X-ray; e.g. see FIGS. 1A-1C, which reproduce images from Buzug, T. M., Computed Tomography from Photon Statistics to Modern Cone Beam CT; Springer 2008, pp. 41, 43, and 45, respectively). In FIGS. 1A-1C, areas highlighted in gray are the 20-400 kV (0.02-0.4 MeV) energy range typically seen in industrial and medical CT instruments. Note the log "y" axis scale and how Compton scattering is a significant component above the ~100 keV range.

Figure 2:
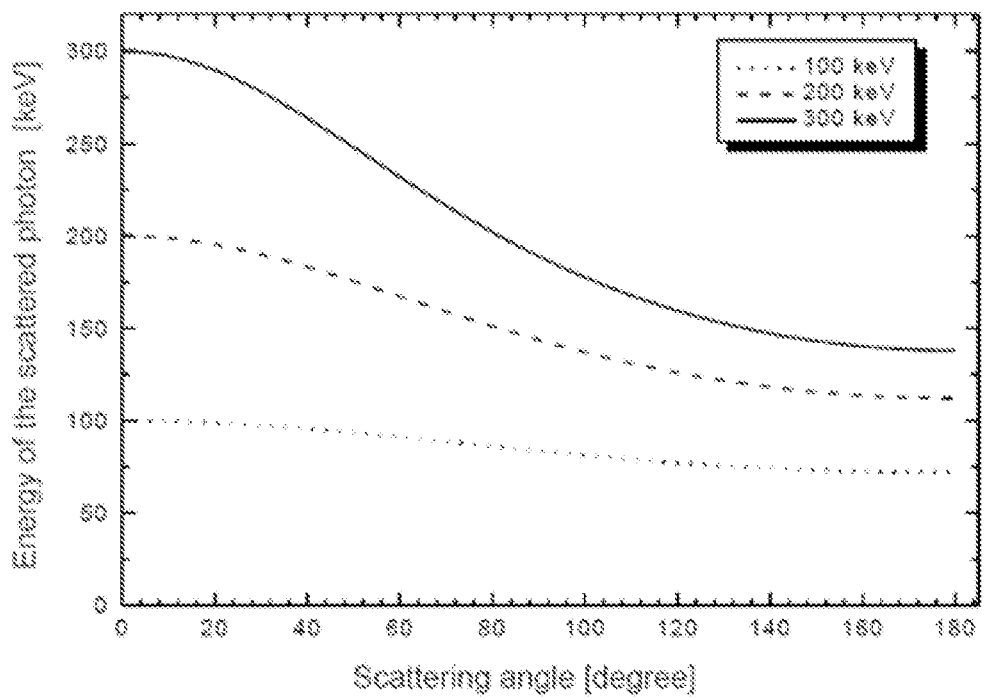
FIG. 2 shows representative data for the directionality of Compton scattered radiation as a function of the energy of the scattered photon.

These are emitted in all directions from a scatter event (e.g., see FIG. 2, which reproduces conventional data). In FIG. 2, the directionality of Compton scattered radiation is shown as a function of the energy of the scattered photon. As shown in the figure, Compton scattered photons are of a lower energy then the initial photon energy, and in general much lower. If emitted towards the interior, they are likely eventually completely absorbed. If emitted towards air, then it is likely they reach the detector. The detector cannot discriminate between X-rays of varying energies. Any X-ray that hits the detector will count as part of the image. Therefore, the Compton scattered X-rays have an effect of blurring an image and make it more difficult to determine true surface aspects and edges. The presently disclosed methods provide for placing a material tailored to appropriately absorb scattered X-rays around or within the sample, but allow for minimal change in scan time and minimal noise, thereby greatly enhancing surface determination.

In various aspects, the disclosed methods pertain to methods for minimizing x-ray scattering artifacts, the method comprising contacting an object with an x-ray scattering mitigation material. In a further aspect, the disclosed methods pertain to methods for minimizing x-ray scattering artifacts, the method comprising: contacting an object with an x-ray scattering mitigation material; wherein the x-ray scattering mitigation material comprises a high electron density material, a fluid, a clay, a zeolite, a zirconia material, or combinations thereof.

The x-ray scattering mitigation material can comprise a high electron density material, such as a metal, a salt comprising a metal, or a material comprising a metal. In some instances, the metal is can be an alkali metal, alkaline earth metal, transition metal, post-transition metal, or combinations thereof. The post-transition metal can be gallium, indium, thallium, tin, lead, bismuth, aluminum, germanium, arsenic, selenium, antimony, tellurium, zinc, cadmium, mercury, or combinations thereof. The transition metal can be metal comprising a group 3-group 11 element, including a transition metal is selected from Sc, Ti, V, Cr, Mn, Fe, Co, Ni, Cu, Y, Zr, Nb, Mo, Tc, Ru, Rh, Pd, Ag, Ta, W, Re, Os, Ir, Pt, Au, or combinations thereof.

In some aspects, the x-ray scattering mitigation material comprises a nanomaterial, such as a nanofluid, nanotube, nanoparticle, or combinations thereof. In some instances, the nanomaterial can comprise carbon nanotubes, multiwall carbon nanotubes, carbon nanoparticles, or combinations thereof. As mentioned, the nanomaterial can be particularly a nanofluid comprising a colloidal suspension of a nanotube, nanoparticle, or combinations thereof. A nanotube useful in the disclosed methods can comprise carbon nanotubes, multiwall carbon nanotubes, or combinations thereof. In various aspects, a nanoparticle useful in the disclosed methods can be a carbon nanoparticle.

In some aspects, the x-ray scattering mitigation material can comprise a fluid such as a nanofluid, a liquid comprising a suspension of nanomaterials, an oil, an organic solvent, a salt solution, a polymer, e.g., a silicone polymer, or combinations thereof. The oil can comprise one or more vegetable oils, hydrocarbon oils, silicone oils, or combinations thereof. In various aspects, the contacting of the method can comprise immersing the object in a fluid comprising an x-ray scattering mitigation material. In some instances, the fluid is a polymer that is a fluid under the conditions used. Thus, in further aspects, the method can comprise heating to at least its melting temperature, and then contacting the object with the melted polymer. In some aspects, the object itself can be heated, e.g., using convection heating, a heated fluid, infrared heating, or microwave heating. In a further aspect, the polymer does not need to be heated and is selected such that it is a fluid or essentially a fluid under at the temperature in which contacting the object is carried out. A fluid can be a polymer, e.g., a silicone polymer material, further comprising an alkali metal, alkaline earth metal, transition metal, post-transition metal, or combinations thereof. In some instances, the fluid can be a nanofluid comprising a colloidal suspension of a nanotube, nanoparticle, or combinations thereof, including, for example, carbon nanotubes, multiwall carbon nanotubes, carbon nanoparticles, or combinations thereof.

In some aspects, the x-ray scattering mitigation material can comprise a clay, a zeolite, a zirconia material, or combinations thereof. The clay, zeolite, zirconia material, or material combinations thereof, can be a solid, including solids such as a powder, particulate, agglomerate, or combinations thereof. In some instances, the solid is a flowable powder or particulate. The clay can be any suitable clay, including a clay comprising a kaolin.

In some aspects, the contacting of the method can comprise coating the object with an x-ray scattering mitigation material. For example, coating the object can comprise spraying a powder coating onto the object. In some instances, the spraying a powder coating onto an object can further comprise spraying an adhesive coating onto the object prior to spraying the powder coating. It is contemplated that the method can further comprise dissolving such an adhesive coating with a powder using a suitable solvent, thereby dissolving the adhesive and removing the powder coating.

A coating used in the disclosed methods can have a single layer thickness of about 1 μm to about 500 μm; about 10 μm to about 100 μm; about 20 μm to about 100 μm; about 30 μm to about 100 μm; or a value within any of the foregoing ranges; or a sub-range within any of the foregoing ranges. It is further contemplated that a coating be a single coating of the foregoing disclosed thickness, or one or more, e.g., 2, 3, 4, 5, 6, 7, 8, 9, 10, 15, or 20 layers of an x-ray scattering mitigation material coating.

In some instances, the x-ray scattering mitigation material is optimized to mitigate Compton scattering. Alternatively, the x-ray scattering mitigation material is optimized to mitigate Rayleigh scattering.

The disclosed method contemplates further comprising exposing the object contacting the x-ray scattering mitigation material to an x-ray beam, such as an x-ray beam is provided by a CT scanner. In various aspects, the x-ray beam is provided by a source with an energy of about 20 kV to about 400 kV. In a further aspect, the x-ray beam has a wavelength of about 0.001 nm to about 0.010 nm.

Disclosed Articles

In various aspects, disclosed herein are objects comprising a disclosed x-ray scattering mitigation materials. The disclosed article comprising a disclosed x-ray scattering mitigation material can be a medical device, a medical implant, an industrial article or part, including an automotive article or part, an aircraft article or part, an article or part in a generator or turbine, and an article or part used in the manufacture of a weapon, ballistic device, or bomb.

In various aspects, disclosed herein are objects such as an image, whether in an electronic or digital form, or a film, obtained of an object comprising a disclosed x-ray scattering mitigation materials. The disclosed image or film obtained can be of article comprising a disclosed x-ray scattering mitigation material wherein the object is a medical device, a medical implant, an industrial article or part, including an automotive article or part, an aircraft article or part, an article or part in a generator or turbine, and an article or part used in the manufacture of a weapon, ballistic device, or bomb.

Aspects

The following listing of exemplary aspects supports and is supported by the disclosure provided herein.

Aspect 1. A method for minimizing x-ray scattering artifacts, the method comprising: contacting an object with an x-ray scattering mitigation material.

Aspect 2. The method of Aspect 1, wherein the x-ray scattering mitigation material comprises a high electron density material.

Aspect 3. The method of Aspect 2, wherein the high electron density material comprises particles comprising a metal, a salt comprising a metal, or a material comprising a metal.

Aspect 4. The method of Aspect 3, wherein in the metal is an alkali metal, alkaline earth metal, transition metal, post-transition metal, or combinations thereof.

Aspect 5. The method of Aspect 4, wherein the post-transition metal is gallium, indium, thallium, tin, lead, bismuth, aluminum, germanium, arsenic, selenium, antimony, tellurium, zinc, cadmium, mercury, or combinations thereof.

Aspect 6. The method of Aspect 4, wherein the transition metal is a group 3-group 11 element.

Aspect 7. The method of Aspect 6, wherein the transition metal is selected from Sc, Ti, V, Cr, Mn, Fe, Co, Ni, Cu, Y, Zr, Nb, Mo, Tc, Ru, Rh, Pd, Ag, Ta, W, Re, Os, Ir, Pt, Au, or combinations thereof.

Aspect 8. The method of any one of Aspect 1-Aspect 7, wherein x-ray scattering mitigation material comprises a nanomaterial.

Aspect 9. The method of Aspect 8, wherein the nanomaterial comprises a nanofluid, nanotube, nanoparticle, or combinations thereof.

Aspect 10. The method of Aspect 9, wherein the nanomaterial comprises carbon nanotubes, multiwall carbon nanotubes, carbon nanoparticles, or combinations thereof.

Aspect 11. The method of Aspect 9, wherein the nanomaterial is a nanofluid comprising a colloidal suspension of a nanotube, nanoparticle, or combinations thereof.

Aspect 12. The method of Aspect 11, wherein the nanotube comprises carbon nanotubes, multiwall carbon nanotubes, or combinations thereof.

Aspect 13. The method of Aspect 11, wherein the nanoparticle comprises a carbon nanoparticle.

Aspect 14. The method of any one of Aspect 1-Aspect 13, wherein the x-ray scattering mitigation material comprises an oil.

Aspect 15. The method of Aspect 14, wherein the oil comprises a vegetable oil.

Aspect 16. The method of Aspect 14, wherein the oil comprises a hydrocarbon oil, a silicone oil, or combinations thereof.

Aspect 17. The method of any one of Aspect 1-Aspect 17, wherein the contacting is immersing the object in a fluid comprising an x-ray scattering mitigation material.

Aspect 18. The method of Aspect 17, wherein the fluid comprises a nanofluid, a nanomaterial, a silicone polymer material.

Aspect 19. The method of Aspect 18, wherein the silicone polymer material comprises one or more silicone polymers comprising an alkali metal, alkaline earth metal, transition metal, post-transition metal, or combinations thereof.

Aspect 20. The method of Aspect 18, wherein the nanofluid comprises a colloidal suspension of a nanotube, nanoparticle, or combinations thereof; or wherein the nanomaterial comprises a nanotube, a nanoparticle, or combinations thereof.

Aspect 21. The method of Aspect 20, wherein the nanotube comprises carbon nanotubes, multiwall carbon nanotubes, or combinations thereof.

Aspect 22. The method of Aspect 20, wherein the nanoparticle comprises a carbon nanoparticle.

Aspect 23. The method of any one of Aspect 1-Aspect 22, wherein the x-ray scattering mitigation material comprises a clay, a zeolite, a zirconia material, or combinations thereof.

Aspect 24. The method of Aspect 23, wherein the clay comprises a kaolin.

Aspect 25. The method of any one of Aspect 1-Aspect 24, wherein the contacting is coating the object with an x-ray scattering mitigation material.

Aspect 26. The method of Aspect 25, wherein the coating is spraying a powder coating comprising an x-ray scattering mitigation material onto the object.

Aspect 27. The method of Aspect 26, further comprising spraying an adhesive coating onto the object prior to spraying a powder coating.

Aspect 28. The method of Aspect 27, wherein the adhesive coating is dissolvable in a solvent.

Aspect 29. The method of Aspect 28, further comprising dissolving the adhesive and removing the powder coating.

Aspect 30. The method of any one of Aspect 25-Aspect 29, wherein the coating has a thickness of about 1 μm to about 500 μm.

Aspect 31. The method of Aspect 30, wherein the coating has a thickness of about 10 μm to about 100 μm.

Aspect 32. The method of Aspect 30, wherein the coating has a thickness of about 20 μm to about 100 μm.

Aspect 33. The method of Aspect 30, wherein the coating has a thickness of about 30 μm to about 100 μm.

Aspect 34. The method of any one of Aspect 1-Aspect 33, wherein the x-ray scattering mitigation material is optimized to mitigate Compton scattering.

Aspect 35. The method of any one of Aspect 1-Aspect 33, wherein the x-ray scattering mitigation material is optimized to mitigate Rayleigh scattering.

Aspect 36. The method of any one of Aspect 1-Aspect 35, further comprising exposing the object contacting the x-ray scattering mitigation material to an x-ray beam.

Aspect 37. The method of Aspect 36, wherein the x-ray beam is provided by a CT scanner.

Aspect 38. The method of Aspect 36 or Aspect 37, wherein the x-ray beam is provided by a source with an energy of about 20 kV to about 400 kV.

Aspect 39. The method of any one of Aspect 36-Aspect 38, wherein the x-ray beam has a wavelength of about 0.001 nm to about 0.010 nm.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

All results presented employed a GE phoenix v|tome|x m X-ray micro CT (BHGE's Measurement & Control business, Boston, USA) at the University of Florida. Scanning was carried out using a 200-230 kV X-ray produced with a micro, or deflection, tube and a tungsten target. The resulting 2D x-ray data were processed using GE's proprietary datos|x software v 2.4 to produce a series of tomogram images These CT image stacks were then viewed, sectioned, measured, and analyzed using VG StudioMax 3.0 (Volume Graphics, Heidelberg, Germany).

Filtering of the original X-ray energy spectrum with tin (or copper where indicated) remove low energy X-rays prior to interacting with the sample was utilized. However, the X-ray energy distribution was still broad, so upon reconstruction a beam hardening correction was applied in all cases to account for the preferential attenuation of lower energy X-ray photons.

Figure 3B:
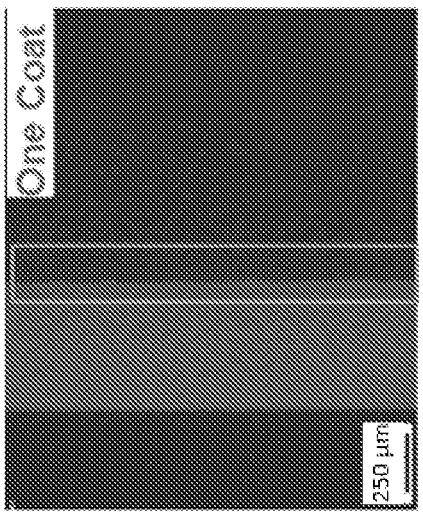
FIGS. 3A-3C show representative cross-sections of two steel tubes coated with fluorinated ethylene propylene (FEP). The steel tubes were either coated with a single coating of FEP or four coatings of FEP, but without any material within the tube cavity.
Figure 3C:
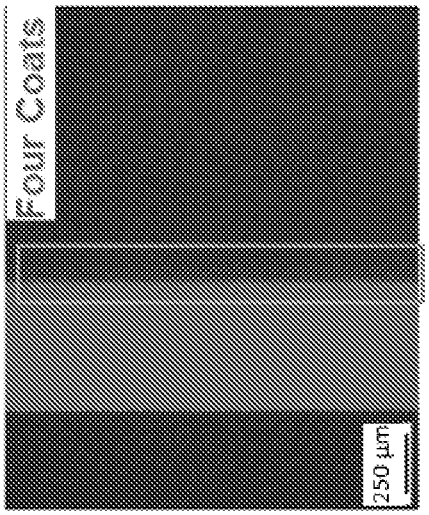
Figure 3A:
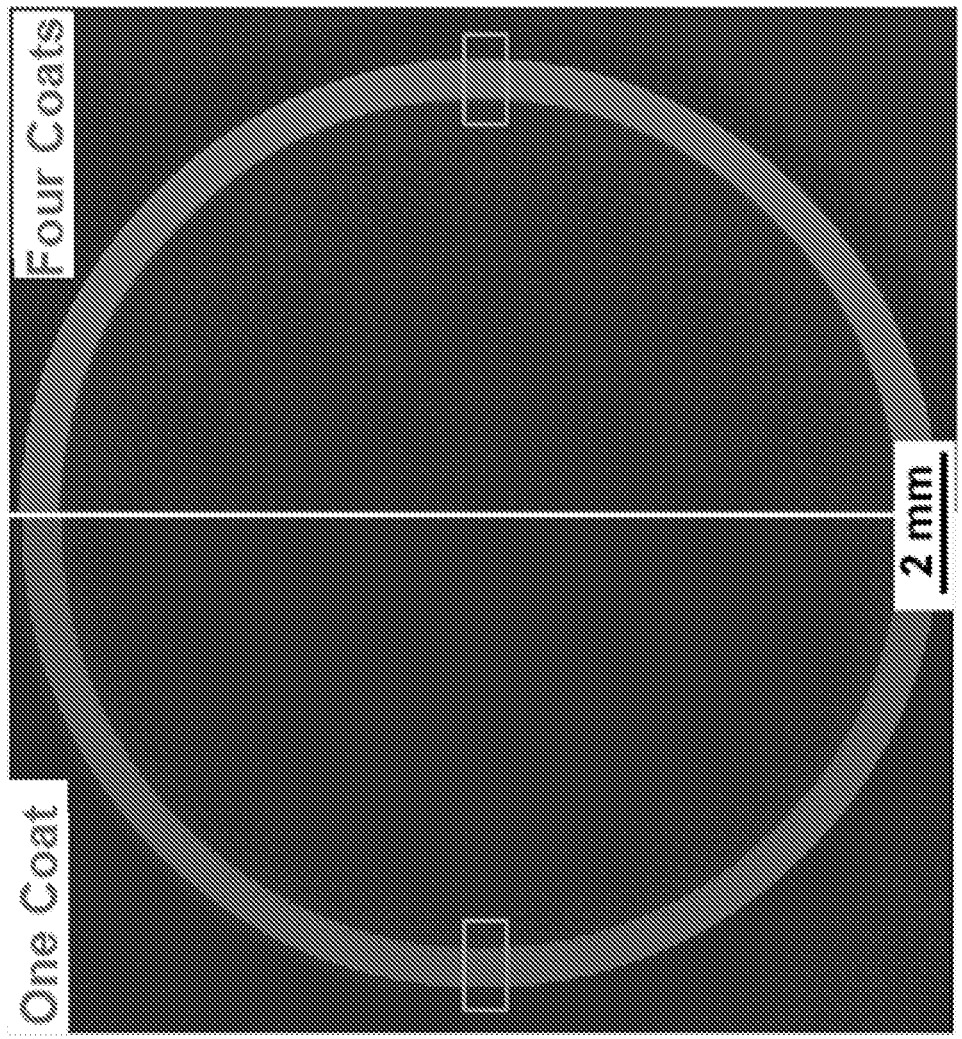
Figures 4A, 4B:
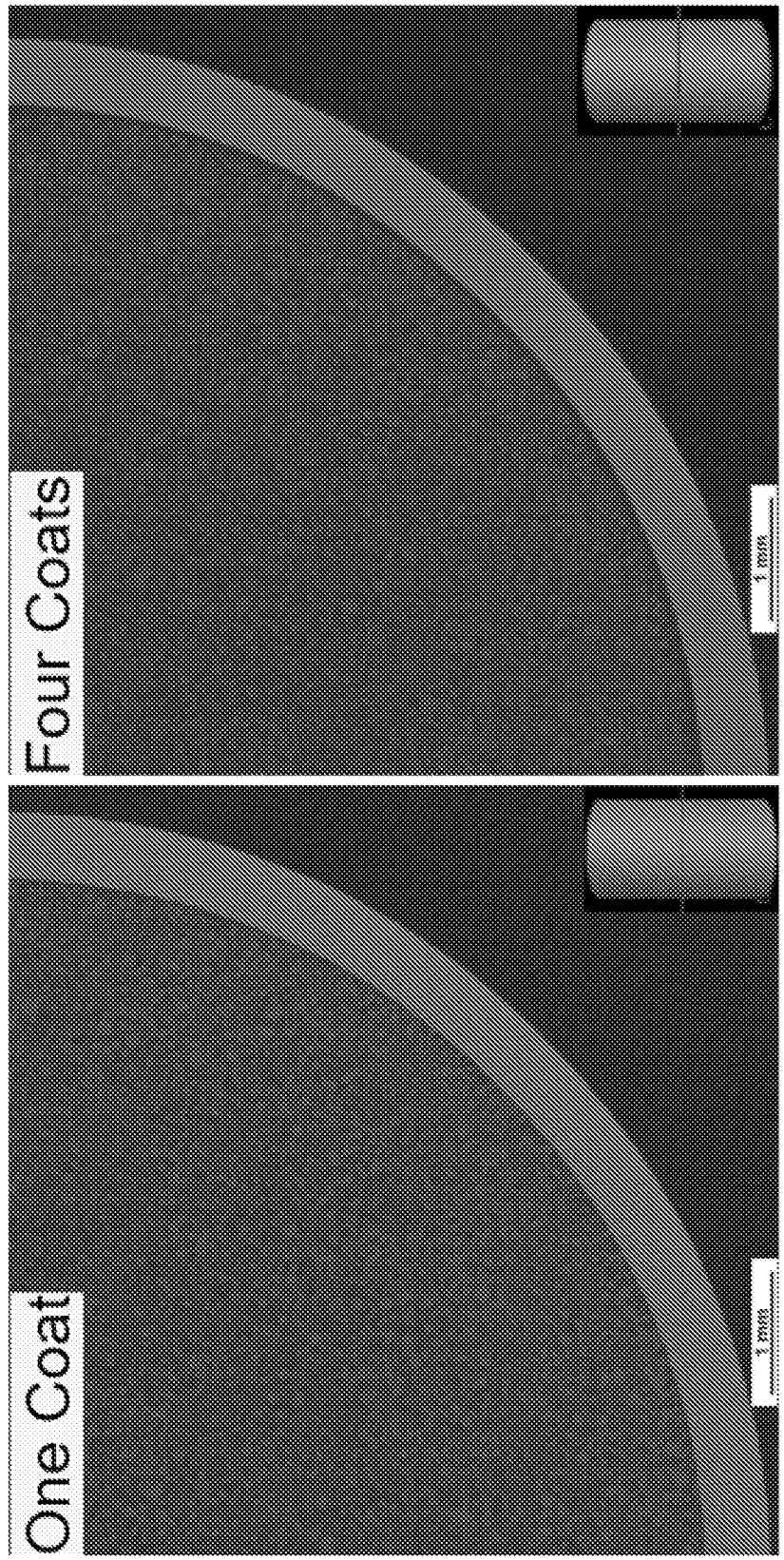
FIGS. 4A-4B show representative cross-sections of two steel tubes coated with fluorinated ethylene propylene (FEP) and containing $ZrO_2$ powder in the interior tube cavity.

Stainless steel tubing with interior FEP coatings (either coated with a single coating or four layered coatings) was analyzed with or without an interior fill of a zirconia powder (TOSOH TZ-3Y, TOSOH Corporation, Tokyo, Japan). These scans were at 10 μm resolution, 500 ms timing, and 200 kV with current limited by keeping the X-ray production spot size less than the voxel size. The image data in FIGS. 3A-3C and 4A-4B show, respectively, cross-sections of either stainless steel tubing without an interior fill of zirconia powder or with an interior fill of zirconia powder. The image data in FIGS. 3A-3C show the difficulty of obtaining images capable of discerning the FEP layer(s) due to internal Raleigh and Compton scattering in the absence of a material in the tube interior to mitigate these scattering effects. In contrast, the image data in FIGS. 4A-4B that the presence of a zirconia fill allows discernment of the interior metal edge and FEP layer(s).

Figure 5:
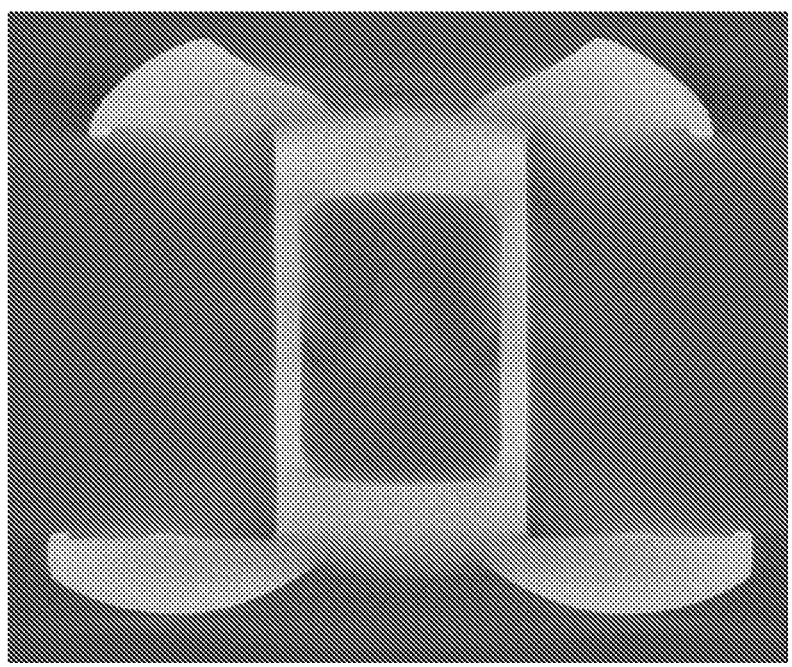
FIG. 5 shows an image of a stainless steel (316 stainless steel) implant. Image capture of the implant was obtained with the implant immersed in canola oil during image capture.
Figure 6:
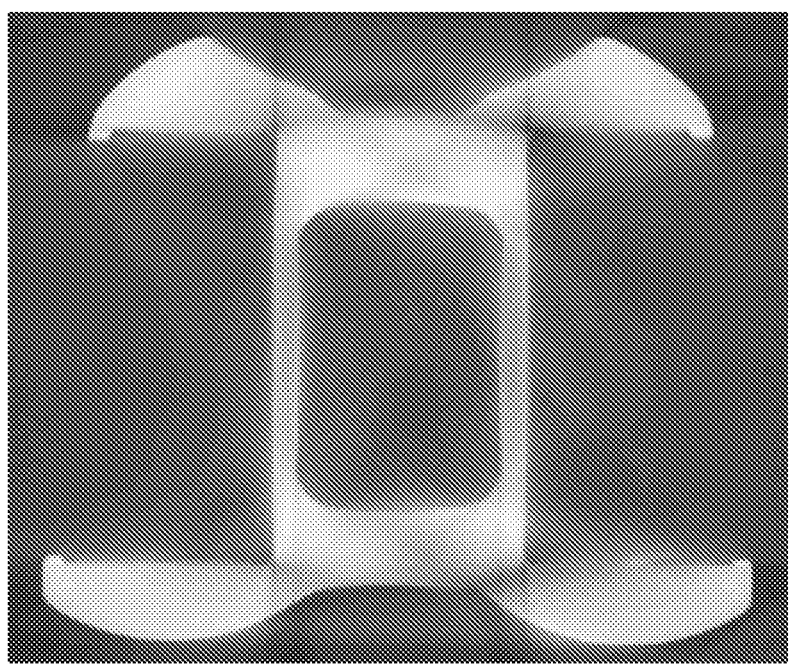
FIG. 6 shows an image of a stainless steel (316 stainless steel) implant. Image capture of the implant was obtained with the implant immersed in canola oil during image capture.
Figure 7:
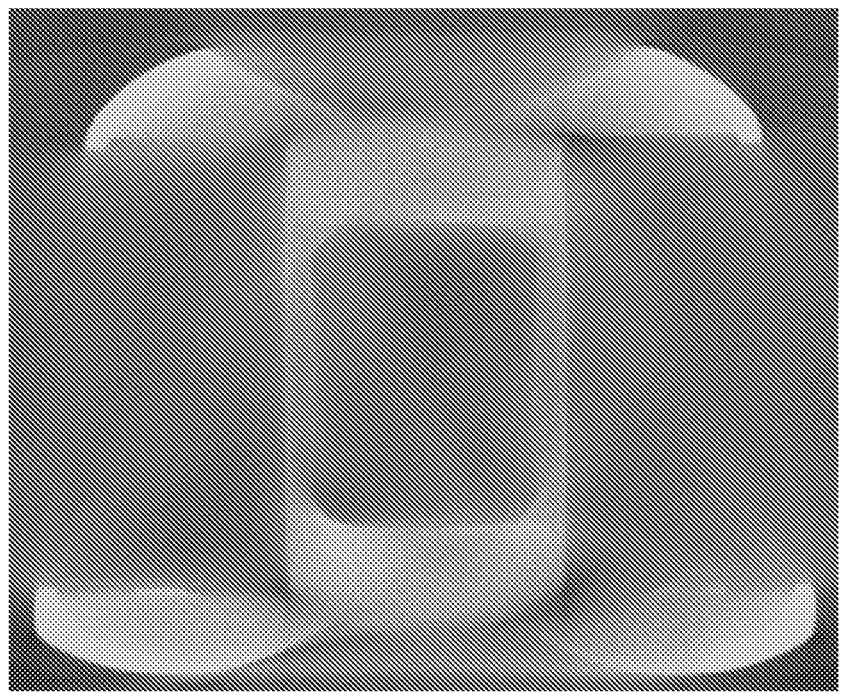
FIG. 7 shows an image of a stainless steel (316 stainless steel) implant. Image capture of the implant was obtained with the implant immersed in canola oil during image capture, and use of a copper filter between the sample and the detector during image capture.
Figure 8:
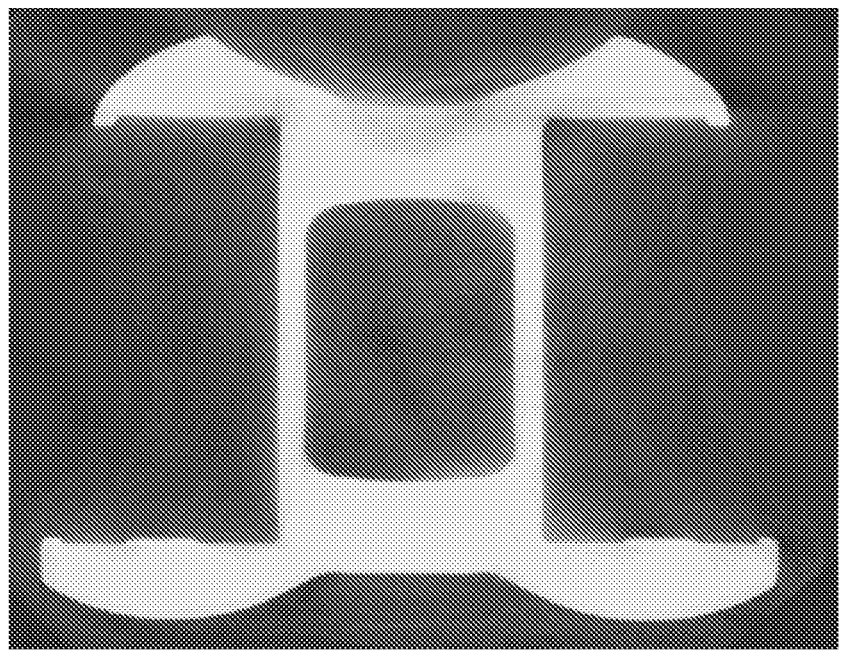
FIG. 8 shows an image of a stainless steel (316 stainless steel) implant. Image capture of the implant was obtained with the implant having sheets of aluminum foil aluminum foil placed in areas previously shown to be subject to scattering artifacts during image capture.

Highly polished stainless steel knee implants with maximum cross sectional lengths of ~60 mm were scanned to create an experimental surface (or stl) file. The resolution of these scans was 66 μm with maximum X-ray energy in the 230-235 range, image acquire time 2 seconds, and fast scan (no stopping of the rotation). These scans pushed the limit of the v|tome|x m resolution and image acuity with a 240 kV tube. FIGS. 5-8 show images obtained in which different materials were assessed for mitigation of scattering effects. In FIG. 5, which was obtained with the implant immersed in water, indistinct edges are highlighted with the boxed areas. The control scan in obtained air is not show as the surface resolution was too indistinct. FIG. 6 shows image data obtained with the implant immersed in canola oil during the scan. The image data shows that canola oil acts as a better attenuating material than water. Differences in scatter patterns as compared to FIG. 5 are likely due to the detector binning used (1000×1000 pixels instead of 2000×2000). FIG. 7 shows image data obtained as in FIG. 6, but also with a copper filter placed between the sample and the detector instead of a tin filter. There was no marked in improvement observed in edge sharpness. FIG. 8 shows image data obtained from an implant have layers of aluminum foil placed on surfaces of the implant and also packing of aluminum foil into crevices of the implant, which the data in the preceding images showed were subject to scattering artifacts. The data show that aluminum sheets or foil act as a better attenuating material than the canola oil.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A method for minimizing x-ray scattering artifacts, the method comprising:
   contacting an object with an x-ray scattering mitigation material;
   wherein the x-ray scattering mitigation material comprises a fluid, wherein the fluid is a vegetable oil, wherein the vegetable oil comprises a colloidal suspension of carbon nanotubes, multiwall carbon nanotubes, carbon nanoparticles, or combinations thereof.

2. The method of claim 1, wherein the contacting is coating the object with an x-ray scattering mitigation material.

3. The method of claim 1, wherein the vegetable oil has a layer thickness of about 1 μm to about 500 μm.

4. A method for minimizing x-ray scattering artifacts, the method comprising:
   contacting an object with an x-ray scattering mitigation material, wherein the x-ray scattering mitigation material comprises a fluid, wherein the fluid is a vegetable oil
   exposing the object contacting the x-ray scattering mitigation material to an x-ray beam, wherein the x-ray scattering mitigation material reduces the x-ray scattering artifacts relative to the x-ray scattering mitigation material not being present; and
   removing the x-ray scattering mitigation material from contacting the object after exposing the object to the x-ray beam.

5. The method of claim 4, wherein the contacting is coating the object with an x-ray scattering mitigation material.

6. The method of claim 4, wherein the vegetable oil has a layer thickness of about 1 μm to about 500 μm.

7. The method of claim 4, wherein the vegetable oil comprises a colloidal suspension of carbon nanotubes, multiwall carbon nanotubes, carbon nanoparticles, or combinations thereof.

* * * * *